Figure 5:
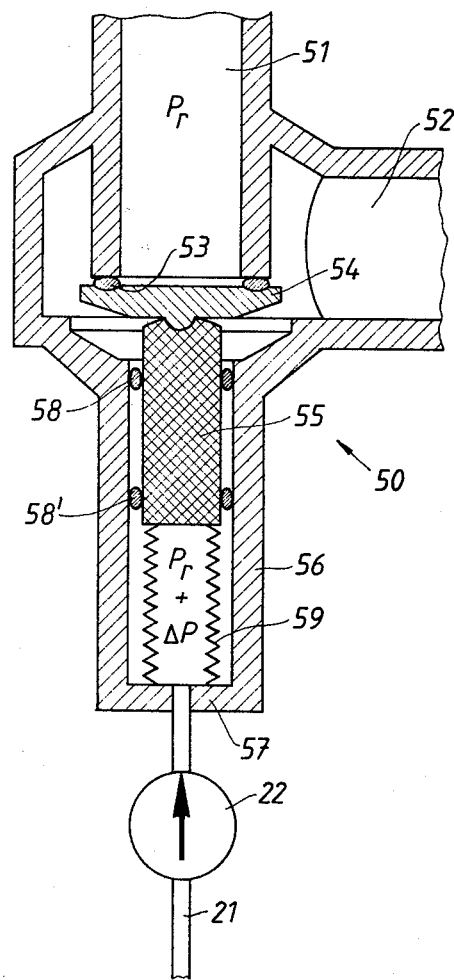

United States Patent [19]

Hannerz

[11] 4,363,780
[45] Dec. 14, 1982

[54] BOILING REACTOR
[75] Inventor: Kåre Hannerz, Västerås, Sweden
[73] Assignee: AB Asea-Atom, Västerås, Sweden
[21] Appl. No.: 216,713
[22] Filed: Dec. 15, 1980
[30] Foreign Application Priority Data
  Dec. 17, 1979 [SE] Sweden .................. 7910355
[51] Int. Cl.³ .............................. G21C 15/18
[52] U.S. Cl. .................... 376/282; 376/283; 376/370
[58] Field of Search .................. 376/282, 283, 370
[56] References Cited
  U.S. PATENT DOCUMENTS
  3,115,450 12/1963 Schanz .................. 376/283
  3,454,466  7/1969 Pitt et al. .............. 376/283
  FOREIGN PATENT DOCUMENTS
  41-11960  6/1966 Japan .................... 376/282

Primary Examiner—Harvey E. Behrend
Attorney, Agent, or Firm—Pollock, Vande Sande & Priddy

[57] ABSTRACT

Boiling reactor comprising a reactor core (1) and a pressure vessel (2) enclosing said reactor core and being provided with at least one conduit for discharged steam and at least one conduit for feed water and during normal operation being filled with water up to a certain normal level (11), the steam pressure in the pressure vessel having a substantially constant value of at least 5 MPa. The pressure vessel (2) is surrounded by a water-filled pool (3) with a water volume above the reactor core (1) which is considerably greater than the water volume within the pressure vessel (2). The pressure vessel (2) is a concrete vessel having an internal thermal insulation (9). The reactor comprises emergency cooling pipes (19, 20) with valves (19', 20') connecting the reactor vessel (2) to the pool (3). The valves (19', 20') are normally closed. The pipes (19, 20) are positioned at different levels. The emergency cooling valves (19', 20') are adapted to be controlled in dependence on the water level (11) in the reactor vessel (2) in such a way that they are opened when the water level is below a certain minimum level. When the valves (19', 20') are opened, steam is flowing out of the reactor vessel (2) through the upper emergency cooling pipe (19), whereas water is flowing from the pool (3) into the reactor vessel (2) through the lower emergency cooling pipes (20) as soon as the difference in static pressure in the pool between lower emergency cooling pipe (20) and upper emergency cooling pipe (19) is greater than the pressure drop of the steam flux passing through the latter. Emergency cooling is achieved entirely without the use of pumps. (FIG. 1.)

7 Claims, 5 Drawing Figures

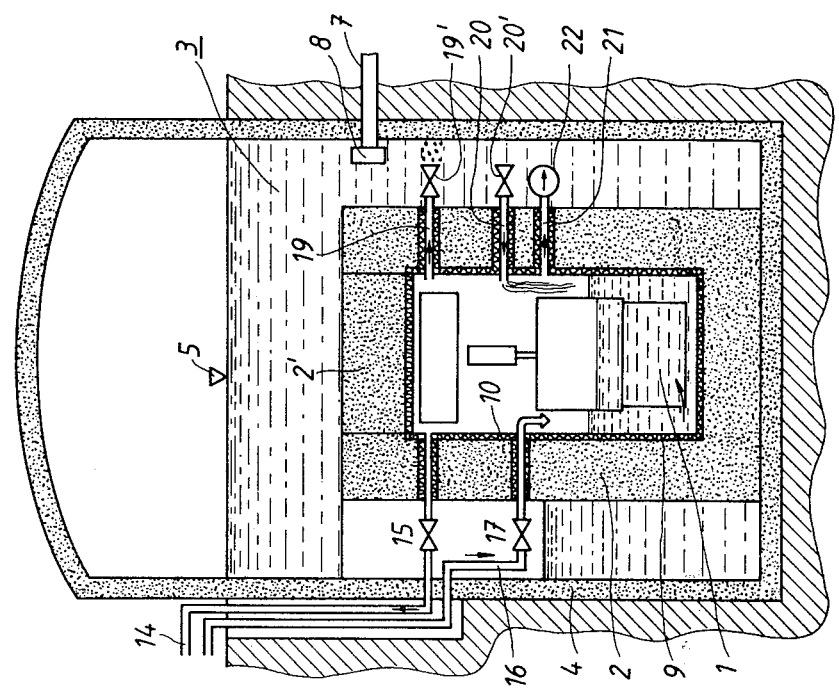
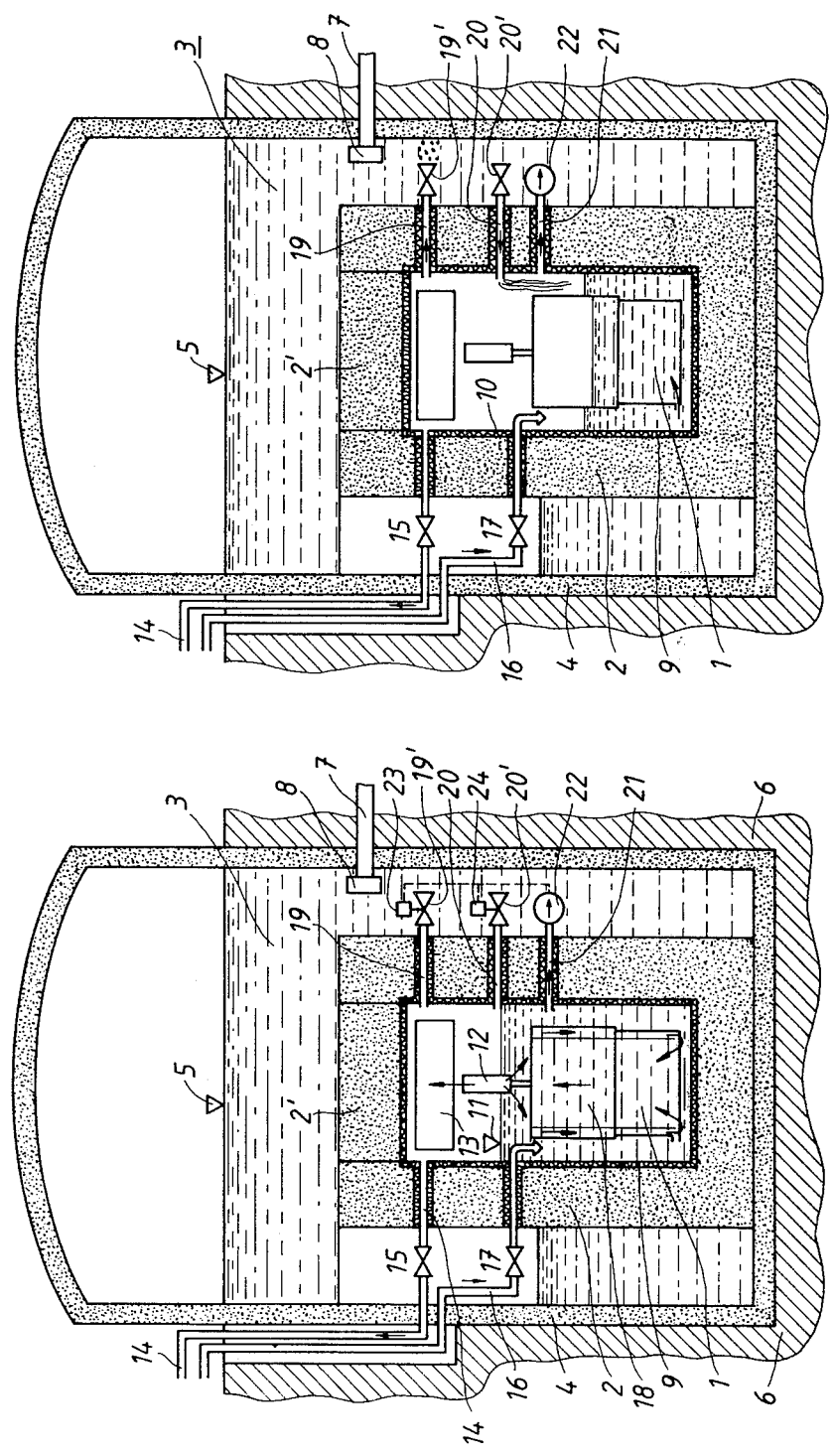

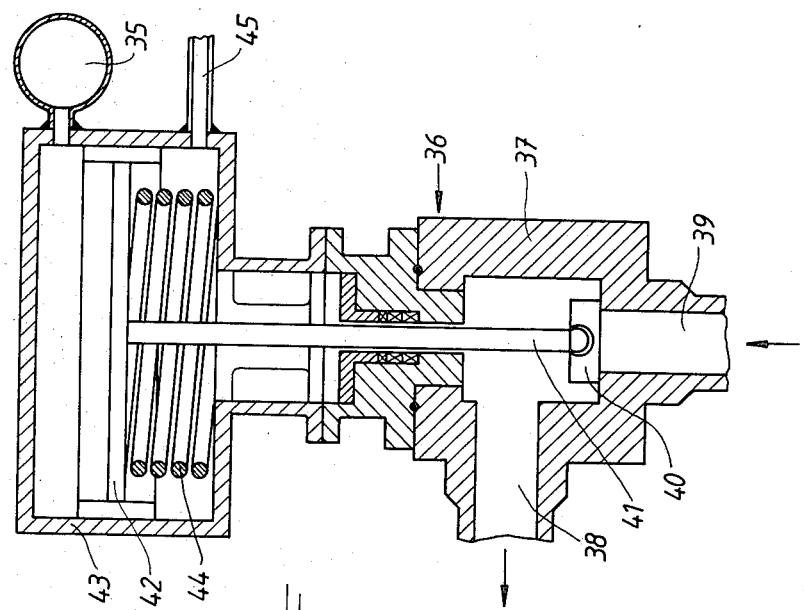
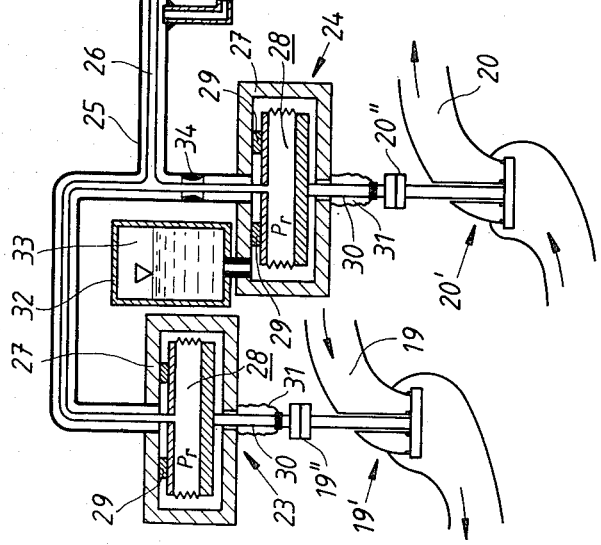
FIG. 3
FIG. 4

BOILING REACTOR

The present invention relates to a boiling reactor according to the preamble to claim 1. More particularly, the invention relates to a boiling reactor having extremely high security against dryout. Reactors for pure heat production with extremely high security against dryout are disclosed in Swedish Pat. No. 7506607-6 and Canadian Pat. Nos. 1,066,435 and 1,070,860.

The above-mentioned known reactors are primarily intended for district heating plants and may only operate at relatively low temperatures, that is, in the temperature range 100°–120° C.

A reactor according to the invention, however, is primarily intended to operate a steam turbine and to produce steam at an operating pressure of at least 5.5 MPa.

What characterises the invention will become clear from the appended claims.

In the following the invention will be described with reference to the accompanying schematic drawings, in which FIG. 1 shows a vertical section through a reactor according to the invention during normal operation, FIG. 2 showing the same reactor in the same vertical section and in a state when blow-out has taken place through an upper emergency cooling pipe in the reactor vessel. Further, FIG. 3 shows a vertical section of valves for an upper and a lower emergency cooling pipe and an associated control system with a first embodiment of the invention.

FIGS. 4 and 5 show details of the control system of the emergency cooling valves in a second and a third embodiment, respectively, of the invention.

In the drawings, 1 designates the reactor core of a boiling reactor and 2 a concrete pressure vessel which is dimensioned for a pressure of at least 5 MPa. The cover of the pressure vessel is designated 2'. The pressure vessel 2 is arranged in a pool space 3 formed by concrete walls 4. The wall of the pressure vessel 2 need not be in contact with the water of the pool. The main thing is that water is present in a sufficient amount in a pool space located above the top of the core. The pool is filled with water to a level indicated by the level symbol 5. The water-filled portion of the pool 3 is arranged in a hollow in the ground, for example in rock, and surrounded, for example, by a dense layer of clay 6, the thickness of which is considerably greater than the thickness of the walls 4. The pool space 3 is preferably provided with a filling pipe which is in communication with some large water reservoir. In FIG. 1 such a filling pipe is designated 7 and provided with a valve 8 controlled by a level monitor (not shown). The pressure vessel 2 is made of prestressed concrete. Internally it has a relatively thick heat insulating layer 9 and inside this a thin metallic lining 10. During normal operation, the pressure vessel 2 is water-filled up to a level indicated by the level symbol 11. The water is driven through the core 1 as indicated by arrows by means of circulating pumps (not shown). There may also be self-circulation. The steam developed in the core passes through the steam separator 12 and a steam dryer 13 and thereafter leaves the pressure vessel 2 through a plurality of steam pipes 14 connected to a turbine, each of said steam pipes being provided with a steam valve 15. The feed water enters into the pressure vessel through a plurality of feed water pipes 16, each of which is provided with a feed water valve 17. Control rods (not shown in the drawing) provided with hydraulic drives are arranged in a water-filled space 18 above the core. The portion of the water-filled space of the pool 3 that is located above the highest point of the reactor core 1, contains an amount of water which is at least as great as the water volume of the reactor vessel during normal operation, preferably more than three times this water volume.

The cylindrical wall of the pressure vessel 2 is provided with at least one upper emergency cooling pipe 19 and with at least one lower emergency cooling pipe 20, which open out into the pool 3 via individual valves 19' and 20', respectively, which are closed during normal reactor operation. The valves 19' and 20' are operable by means of separate hydraulic differential control devices 23 and 24, respectively, in such a way that the valves are closed for as long as a pressure difference—supplied to each of the control devices—lies above a certain value, but fully opened when the pressure difference falls below said value. The pressure difference supplied to the control devices 23 and 24 is created by a sensing pump 22 arranged outside the pressure vessel 2, the input side of said pump 22 being connected to a sensing pipe 21 which opens out into the pressure vessel 2 at a level located below the normal level 11, but not below the lowest permissible water level in the pressure vessel 2.

The emergency cooling pipe 19 is intended for steam which is flowing out, whereas the emergency cooling pipe 20 is intended for pool water flowing into the pressure vessel. In the event of damage, such an amount of steam shall be able to flow out through pipe 19 and valve 19' that the steam pressure in the pressure vessel falls from the normal operating pressure to a pressure which differs only to a minor extent, for example with a water column less than three meters, from the hydrostatic pressure at the place in the pool 3 where the emergency cooling pipe 19 passes through the wall of the pressure vessel. If this hydrostatic pressure is compared with the pressure at the position in the pool where the emergency cooling pipe 20 passes through the wall of the pressure vessel, it is seen that water flows into the pressure vessel through the pipe 20 when the difference between the first-mentioned and the last-mentioned pressure exceeds the pressure drop of the steam through pipe 19 and valve 19'.

The principle of operation of the hydraulic differential devices 23 and 24 will be clear from FIG. 3.

During normal operation the sensing pump 22 runs continuously. The differential devices 23 and 24 are supplied by way of two concentric conduits 25 and 26 branching to each of them, with a first pressure $P_r$ which is the pressure in the reactor pressure vessel 2 at the position where the sensing pipe 21 opens out into the pressure vessel, and with a second pressure $P_t$ which is the sum of $P_r$ and a pressure $\Delta P$ which is achieved by means of the sensing pump 22. The pressure $P_r$ is supplied to the two pressure differential devices 23 and 24 via conduit 26 and the pressure $P_t$ is supplied via conduit 25. Each of the devices 23 and 24 consists of a closed, circular, cylindrical pressure container 27 and a coaxially arranged bellows 28 arranged in said pressure container 27, said bellows 28 being flexible in the axial direction. One of the end walls of the bellows 28 is mechanically connected to a plane, circular inner surface of the container 27 with the aid of a plurality of fixing blocks 29, whereas the other end wall of the bellows is provided with an operating rod 30 which is passed pressure-tightly through the wall of the pressure container by means of a sealing bellows 31 welded to the wall of the pressure container and to the operating rod. In each of the differential pressure devices 23 and 24, the pressure container 27 is hydraulically connected to the conduit 25 and the bellows 28 is hydraulically connected to the conduit 26. During normal reactor operation, each bellows 28 has an internal pressure $P_r$, which is equal to the pressure in the reactor pressure vessel 2 at the position where the sensing conduit 21 opens out into the pressure vessel, whereas the external pressure $P_t$ of each of the bellows 28 is equal to $P_r + \Delta P$. This means that each bellows 28 is subjected to an axial force which is proportional to $P_t - P_r$, that is, to the pump pressure $\Delta P$. During normal reactor operation, the pump pressure $\Delta P$ is constant and its value is in the range of 2–30%, preferably 3–15% of the steam pressure in the pressure vessel 2. The above-mentioned force which is proportional to the pump pressure is for the main part taken up by the valve 19' and 20', respectively, in such a way that the valve is held closed. Each operating rod 30 is connected to the corresponding valve by means of a mechanical coupling 19" and 20", respectively.

When the pressure difference $\Delta P$ falls below a certain value, each of the bellows 28 is extended to such a degree that the valves 19' and 20' open. As opposed to valve 19', valve 20' opens with a certain delay. This is accomplished by means of a delay device consisting of an auxiliary pressure container 32 connected to the container 27 in combination with a throttle device 34 arranged in the thickest of the two pressure pipes connected to the difference device 24. The auxiliary pressure container 32 contains an air cushion 33.

If a tube rupture should occur in a steam conduit 14 or a feed water pipe 16, the water level in the pressure vessel 2 may drop considerably below the normal level 11. If the water level drops below a certain permissible level, that is, so low that the suction opening of the sensing conduit 21 no longer emerges into the water, a significant reduction of the output pressure of the sensing pump 22, that is of the pressure difference $\Delta P$, will occur, resulting in the emergency valve 19' of the upper emergency cooling pipe 19 opening and in steam being blown into the pool water and being condensed therein. After a short time interval, for example 3–30 minutes, preferably 5–15 minutes, such an amount of steam has blown out that the pressure in the pressure vessel 2 has dropped from a normal value of at least 5 MPa to a value determined by the water level 5 in pool 3, and at this time also the delayed emergency cooling valve 20' opens causing pool water to flow into the pressure vessel 2 through the lower emergency cooling pipe 21, as indicated on FIG. 2.

Because conduit 26 is surrounded by conduit 25, the former is well protected against tube rupture. If a tube rupture should occur in conduit 25, this would result in the emergency cooling valves opening.

A rapid blow-out, that is a blow-out involving a relatively large amount of steam per time unit, easily results in the water present in the pressure vessel being mixed with steam to such an extent that there will hardly be any well-defined limit between water and steam. When describing the manner of operation of the emergency cooling system in a reactor according to the invention, it is consequently not sufficient to establish that the pressure of the sensing pump is considerably reduced when the water level drops below a certain limit. If the water present in the pressure vessel becomes mixed with steam to a substantial extent, this is—in a reactor according to the invention—a criterion that the described emergency cooling system should be actuated. An actuation will take place when the steam content of the water near the inlet opening of the sensing pipe 21 rises beyond a certain value at which the output pressure of the sensing pump drops below the minimum pressure required for keeping the valves 19' and 20' shut.

When the emergency cooling valves have opened and water streams into the pressure vessel and steam flows out of it in the manner described above, the core will become cooled in a reliable manner by natural circulation between the core and the pool. The reactor vessel is made so large that, in all cases that may occur, the core remains covered by water during the whole blow down process and also after the blow down.

Drainage of the core, which is a condition for a core melt-down, can now only take place when the water of the pool has boiled away. The pool is made so large that its water would last for several weeks. In addition, water can be supplied through conduit 7. The reactor vessel 2 is preferably provided with a plurality of upper emergency cooling pipes 19 and with a plurality of lower emergency cooling pipes 20, each emergency cooling pipe being provided with an emergency cooling valve and an associated differential pressure device.

A reactor according to the invention, for example that disclosed in FIGS. 1–3, is preferably made with a plurality of upper emergency cooling pipes 19, which are each furnished with a controlled valve 19' and a corresponding differential control device 23. It is then advantageous to furnish some of the differential control devices 23 with individual delay devices, having different delay times which are all smaller than the delay time of the differential control device 24. This may, for example, be accomplished by means of the delay device disclosed in FIG. 3. A signal from a level transducer, for example the sensing pump 22, will then give a practically undelayed response from one of the valves 19' and actuate other valves 19' with intervals which are greater than one minute, preferably greater than two minutes. Thus, too violent a boiling in the pressure vessel is avoided.

Instead of the arrangement shown in FIG. 3, a slightly deviating version may be used, in which the sensing pump 22 and the conduits 21, 25 and 26 are arranged with respect to each other and the reactor vessel 2 as shown in FIG. 3, but in which a plurality of emergency cooling valves 36, mutually equally constructed according to FIG. 4, are arranged to be controlled by means of a common compressed air source, which is designated 35 in FIG. 4. The compressed air source 35 may suitably be connected to a number of upper and to a number of lower emergency cooling valves, the latter being connected to the compressed air source 35 via a common delay device, which is constructed according to the same principle as that shown in FIG. 3. Valve 36 has a valve housing 37 with two bored holes 38 and 39, of which bore 38 opens out into the pool water whereas bore 39 is intended to be connected to an emergency cooling pipe. A valve disc 40 is connected via an operating rod 41 to an operating piston 42, which is arranged in an operating cylinder 43. A spring 44 is arranged to exert a compressive force on the lower side of piston 42. During normal reactor operation, spring 44 is compressed and the valve is closed by compressed air from source 35 providing a holding pressure on the upper side of operating piston 42. If the pressure ΔP of the sensing pump 22 drops below a certain value, the differential pressure device 23 opens an emptying valve (not shown) associated with the compressed air source 35, which results in the holding pressure disappearing and in all emergency cooling valves, connected to source 35, being opened.

The pressure cylinder space present below the operating piston 42 is provided with a connection 45 for operating pressure during normal blow down and for testing during operation.

The above-described emergency cooling principle results in a temperature reduction, in the space surrounded by the pressure vessel, which is considerable and which may take place in a very short time. Since the pressure vessel is a concrete vessel which is provided with internal heat insulation, similarly to known concrete vessels, the pressure vessel is capable of enduring the rapid temperature reduction.

With the embodiment illustrated by FIG. 5, a plurality of emergency cooling pipes of the kind designated 19 in FIG. 1 and a plurality of emergency pipes of the kind designated 20 in FIG. 1 are furnished with individual valve assemblies, each valve assembly comprising an emergency cooling valve and a corresponding control means disposed in a valve housing 50. One of these valve assemblies is disclosed in FIG. 5. All valve assemblies are preferably of one and the same design, except for the fact that some of them are furnished with delay means.

The valve housing 50 has a high pressure channel 51 connected to an emergency pipe and a low pressure channel 52 connected to the water pool 3. The inner end of the high pressure channel 51 is furnished with an annular valve seat 53 and closed during normal reactor operation by means of a movable valve member 54. The valve member 54 is mechanically connected to a cylindrical actuating member 55. The valve housing 50 has a projecting cylindrical valve housing compartment 56 furnished with an end wall 57 at its axially outer end. The cylinder axis of the valve housing compartment 56 is directed towards the central point of the annular valve seat 53. The actuating member 55 is journalled coaxially and axially movable in the housing compartment 56 by means of two, non-tightening sliding rings 58 and 58'. A tube-like bellows 59 is disposed coaxially in the housing compartment 56. The axially inner end of the bellows 59 is arranged in fluid-tight mechanical connection with the actuating member 55, whereas the axially outer end of the bellows is arranged in fluid-tight mechanical connection with the end wall 57. The outlet of the sensing pump 22 is hydraulically connected to the interior of the bellows through an inlet opening made in the end wall 57.

In the same way as above, the pressure of the pressure vessel 2 is designated $P_r$, and the additional pressure produced by the sensing pump 22 is called ΔP. The area subjected to high pressure is substantially greater with the movable valve member 54 than with the actuating member 55. During normal reactor operation, however, the additional pressure ΔP is so great that the movable valve member 54 is retained in its blocking position.

As soon as the pressure ΔP drops below a certain value, the movable valve member 53 is moved out of its blocking position. In cases where a delayed action is desired, the valve assembly described above may be furnished with delay means. If, for example, the delay means disclosed in FIG. 3 are used, the pressure container 32 may be connected to a branch extending from the connection pipe between the sensing pump 22 and the bellows 59, and the throttle device 34 may be inserted in this connection pipe between the branch and the sensing pump 22.

In addition to the designs described with reference to the drawings, there are other feasible embodiments of a reactor according to the invention. For example, instead of the pool 3, a water reservoir not surrounding the pressure cylinder can be used. Further, instead of the sensing pump 22, it is possible to use a conventional level transducer.

I claim:

1. Boiling water reactor comprising a reactor core (1) and a pressure vessel (2) surrounding said core and being provided with at least one conduit (14) for discharged steam and at least one conduit (16) for feed water and which, during normal operation, is filled with water up to a certain normal level (11), the steam pressure in the pressure vessel having a substantially constant value of at least 5 MPa, said pressure vessel being disposed with respect to a water reservoir (3) in such a way that a portion of the water-filled space of the reservoir positioned above the reactor core has a volume which is at least as large as the water volume present in the pressure vessel, characterised in that said pressure vessel is constructed as a substantially hollow-cylindrical body with a vertical axis and has an internal heat-insulating layer (9) and a metallic lining (10), arranged radially inside said layer (9), that at least one upper emergency cooling pipe (19), which in said pressure vessel (2) opens out above said normal level (11) is passed through said lining, said layer and through the wall of the pressure vessel, and arranged to open out into said reservoir via a corresponding, normally closed, first emergency cooling valve (19'), whereas at least one lower emergency cooling pipe (20), opening out into the pressure vessel, is arranged to open out into said reservoir via a corresponding, normally closed, second emergency cooling valve (20'), said lower emergency cooling pipe (20) penetrating said lining below the zone where said lining is penetrated by said upper emergency cooling pipe (19), said first (19') and second (20') emergency cooling valves being each individually controllable by first (23) and second (24) control means, respectively, which are both responsive to the output signal of a level transducer (22), said level transducer being arranged to give a signal for opening of said first and said second emergency cooling valves when, in said pressure vessel (2), the water depth is at least 10% smaller than the water depth at said normal level (11), but sufficient for keeping said reactor core under water.

2. Boiling water reactor according to claim 1, in which said second control means (24) include delay means (33, 34) to delay the response of said second emergency valve(s) (20') upon said level transducer signal with respect to the response of said first emergency valve(s)(19') upon the same signal.

3. Boiling water reactor according to claim 2, in which the delay time of said second emergency valve(s) with respect to said signal is within the range of 3–30 minutes.

4. Boiling water reactor according to claim 2, in which said first control means (23) include delay means to delay the response of at least one of said first emergency valves (19') with respect to another first emergency valve (19').

5. Boiling water reactor according to claim 1, characterised in that said first (19') and said second (20') emergency cooling valves are individually controlled by means of corresponding hydraulic control devices (23, 24), each provided with a first (26) and a second (25) hydraulic operating conduit in such a way that said emergency cooling valves (19', 20') are closed when the difference between the pressures in the two operating conduits (26, 25) is maintained above a certain level, but opened when said pressure difference drops below this value, and that a sensing pipe (21) is arranged to open out with one end into said pressure vessel (2) above the reactor core (1) and below said normal level (11), whereas the other end of the sensing pipe (21) is connected to said first (26) operating conduit and to the inlet side of a sensing pump (22) arranged outside the pressure vessel (2) the outlet side of said pump (22) being connected to said second operating conduit (25).

6. Boiling water reactor according to claim 1, characterised in that each of said first and said second control means comprises an operating device for a valve disc (40), which operating device comprises a spring (44) which provides an operating force in the opening direction of the valve and a piston (42) which is influenced by a pressure medium in the closing direction of the valve (19, 20), and that discharge valves for this pressure medium are controlled in dependence on the water level (11) in the reactor, too low a water level then initiating an opening of said discharge valves and thus an opening of the emergency cooling valves (19, 20).

7. Boiling water reactor according to claim 1, characterised in that said level transducer comprises a sensing pipe (21), inserted in said pressure vessel, and a sensing pump (22) connected to the outer end of said sensing pipe, and that each of said first and said second emergency cooling valves has a valve housing (50) which is made with a high pressure channel (51) connecting the valve to one of said emergency cooling pipes, and with a low pressure channel (52) connecting the valve to said water reservoir, the inner end of said high pressure channel being furnished with an annular valve seat (53), and that said valve housing (50) has a projecting, cylindrical valve housing compartment (56), oriented with its cylinder axis directed towards said valve seat (53), said valve housing compartment surrounding coaxially a cylindrical, axially movable actuating member (55) which is mechanically connected to a movable valve member (54) adapted to said valve seat (53), whereas an axial outer end of said actuating member (55) abuts an axial inner end of a bellows (59) disposed in said valve housing compartment, whereas an axially outer end of said bellows (59) abuts an end wall (57) of said valve housing compartment (56), the interior of said bellows being hydraulically connected to the outlet of said sensing pump (22).

* * * * *